US006260154B1

(12) United States Patent
Jeddeloh

(10) Patent No.: US 6,260,154 B1
(45) Date of Patent: *Jul. 10, 2001

(54) APPARATUS FOR ALIGNING CLOCK AND DATA SIGNALS RECEIVED FROM A RAM

(75) Inventor: Joseph M. Jeddeloh, Minneapolis, MN (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/625,077

(22) Filed: Jul. 25, 2000

Related U.S. Application Data

(63) Continuation of application No. 09/183,627, filed on Oct. 30, 1998, now Pat. No. 6,101,612.

(51) Int. Cl.[7] .............................. G06F 1/04; G06F 12/00
(52) U.S. Cl. ................................................ 713/401
(58) Field of Search .................................... 713/400, 401, 713/503; 711/167

(56) References Cited

U.S. PATENT DOCUMENTS 5,623,311 * 4/1997 Phillips et al. ..................... 348/396
5,726,650 * 3/1998 Yeoh et al. ......................... 341/70
6,041,419 * 3/2000 Huang et al. ...................... 713/401

* cited by examiner

*Primary Examiner*—Thomas M. Heckler
(74) *Attorney, Agent, or Firm*—Park, Vaughan & Fleming LLP

(57) ABSTRACT

One embodiment of the present invention provides an apparatus for aligning a data signal and a data clock signal received from a memory during a read operation. The apparatus includes a data input for receiving the data signal, and a clock input for receiving the data clock signal. The data signal and the data clock signal feed into an offset mechanism that determines an offset between the data clock signal and the data signal. This offset feeds into a comparison mechanism that determines if the offset is outside of a valid range. If the offset is outside of the valid range, an adjustment mechanism adjusts a delay between the data clock signal and the data signal. In a variation on the above embodiment, the apparatus is implemented in special-purpose hardware within a memory controller, and operates periodically while the computer system is running. In another variation, the apparatus is implemented as part of a system BIOS program stored in read only memory and operates during system startup.

27 Claims, 7 Drawing Sheets

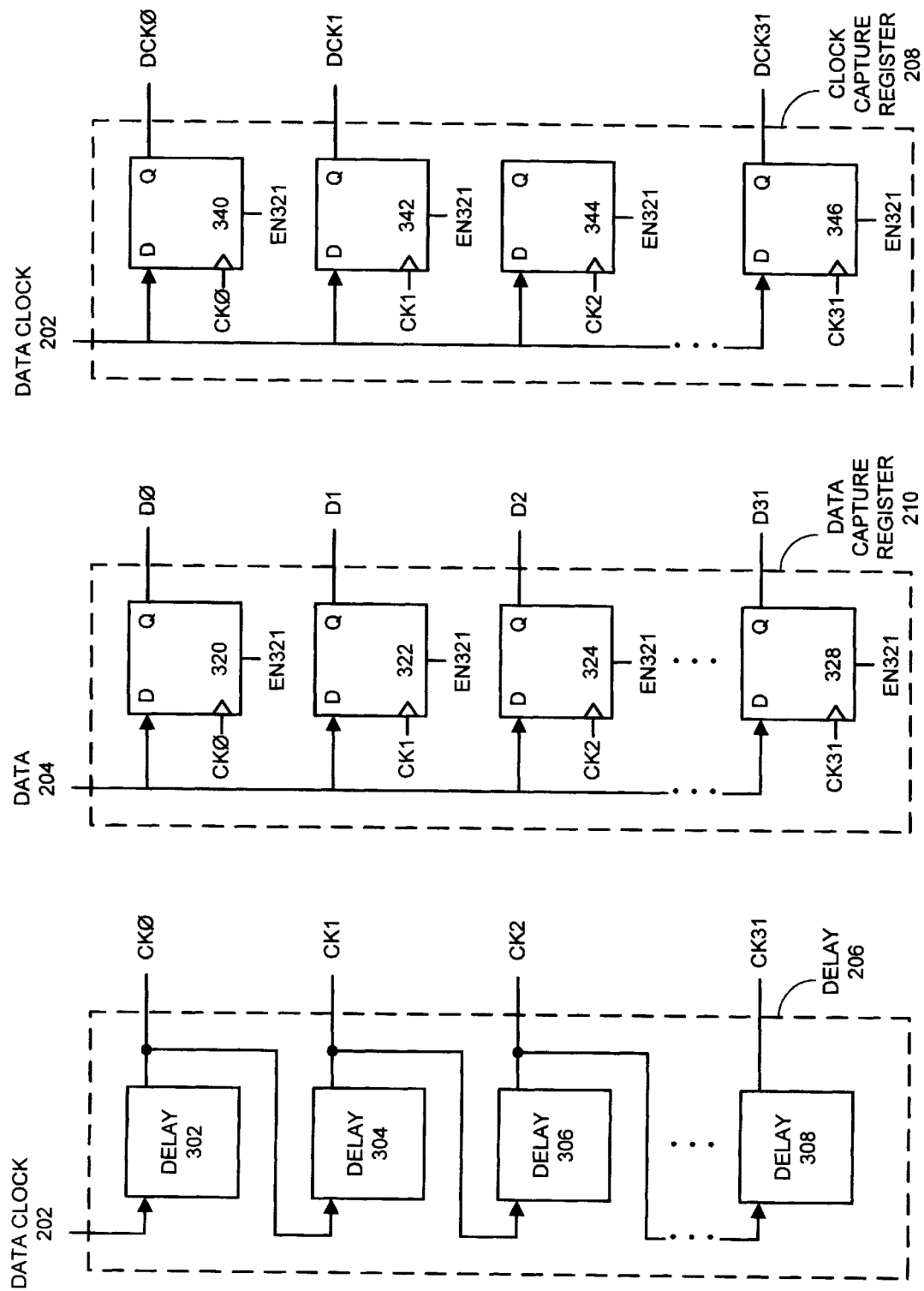

APPARATUS FOR ALIGNING CLOCK AND DATA SIGNALS RECEIVED FROM A RAM

This application is a continuation of Ser. No. 09/183,627 filed Oct. 30, 1998 U.S. Pat. No. 6,101,612.

RELATED APPLICATION

The subject matter of this application is related to the subject matter in a co-pending non-provisional application by the same inventor(s) as the instant application and filed on the same day as the instant application entitled, "Method for Aligning Clock and Data Signals Received From a RAM," having Ser. No. 09/183,781, and filing date Oct. 30, 1998, now U.S. Pat. No. 6,108,795.

BACKGROUND

1. Field of the Invention

The present invention relates to memory systems for computers, and more particularly to the design of a memory interface that automatically adjusts the timing between data and clock signals received from a memory during a read operation.

2. Related Art

As processor speeds continue to increase, memory systems are under increasing pressure to provide data at faster rates. This has recently led to the development of new memory system designs. Memory latencies have been dramatically decreased by using page mode and extended data out (EDO) memory designs, which achieve a high burst rate and low latencies within a single page of memory. Another recent innovation is to incorporate a synchronous clocked interface into a memory chip, thereby allowing data from within the same page of memory to be clocked out of the memory in a continuous stream. Such memory chips, with clocked interfaces are known as synchronous random access memories.

Recently, standards such as Rambus, SyncLink and DDR have been developed to govern the transfer of data between memory and processor using such clocked interfaces. SyncLink, which will be known as IEEE Standard 1596.7, specifies an architecture that supports a 64 M-bit memory with a data transfer rate of 1.6 gigabytes per second. SyncLink packetizes and pipelines the address, command and timing signals, and adds features that significantly increase data bus speed, thereby providing fast memory accesses without losing the ability to move quickly from row to row or to obtain bursts of data. DDR is an acronym for Double Data Rate SDRAM; SDRAM is an acronym for Synchronous Dynamic Random Access Memory.

During read operations, SyncLink (and DDR) memories return a data clock signal (or data strobe) along with the data, and this data clock signal is used to clock the data into the processor (or into a memory controller attached to the processor). This differs from conventional memory systems, which rely on the system clock to latch data received during read operations.

Designing an interface that receives a data clock signal from a SyncLink memory during a read operation presents challenges because a certain amount of skew typically arises between the data signal and the data clock signal. If this skew is large enough, a clock edge, which is used to latch the data signal, can move from the center of the "data eye" of the data signal into a transitional region or into another data eye. This may cause spurious data to be latched during read operations. To remedy this problem, the SyncLink standard allows the timing between the data signal and the data clock signal to be aligned by adjusting an internal delay counter in within a SyncLink memory device. However, corresponding external support circuitry does not presently exist to perform this alignment.

What is needed is a system that measures skew between a data clock signal and a data signal received from a memory during a read operation and that adjusts the temporal alignment between these signals if necessary.

SUMMARY

One embodiment of the present invention provides an apparatus for aligning a data signal and a data clock signal received from a memory during a read operation. The apparatus includes a data input for receiving the data signal, and a clock input for receiving the data clock signal. The data signal and the data clock signal feed into an offset mechanism that determines an offset between the data clock signal and the data signal. This offset feeds into a comparison mechanism that determines if the offset is outside of a valid range. If the offset is outside of the valid range, an adjustment mechanism adjusts a delay between the data clock signal and the data signal. In a variation on the above embodiment, the apparatus is implemented in special-purpose hardware within a memory controller, and operates periodically while the computer system is running. In another variation, the apparatus is implemented as part of a system BIOS program stored in read only memory and operates during system startup.

BRIEF DESCRIPTION OF THE FIGURES

FIG. 3A illustrates a delay circuit in accordance with an embodiment of the present invention.

FIG. 3B illustrates a data capture register for capturing a snapshot of the data signal in accordance with an embodiment of the present invention.

FIG. 3C illustrates a clock capture register for capturing a snapshot of the data clock signal in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

DESCRIPTION OF COMPUTER SYSTEM

Figure 1:
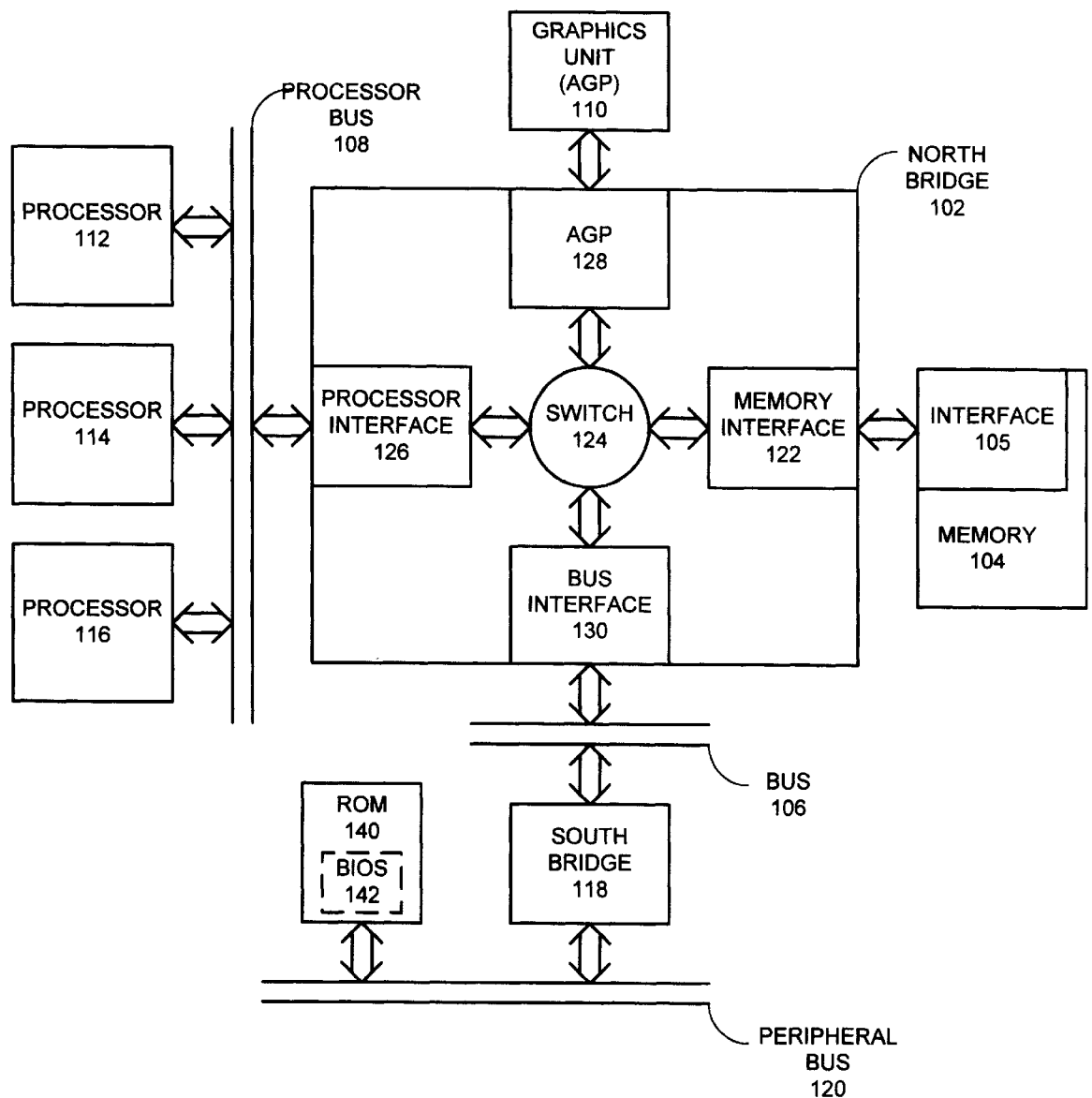
FIG. 1 is a block diagram illustrating a computer system in accordance with an embodiment of the present invention.

FIG. 1 illustrates a computer system including a random access memory in accordance with an embodiment of the present invention. The computer system illustrated in FIG. 1 includes processors 112, 114 and 116, which are coupled to processor bus 108. Processors 112, 114 and 116 may be any type of general or special purpose processors, including, but not limited to microprocessors, mainframe computers, digital signal processors, graphics processors and device controllers. Processor bus 108 may be any type of communication channel for coupling a processor to other devices in the computer system, including peripheral devices, memory devices and other processors.

North bridge 102 couples processor bus 108 to memory 104, graphics unit 110 and bus 106. As illustrated in FIG. 1, north bridge 102 contains: processor interface 126 for communicating with processor bus 108; accelerated graphics port (AGP) 128 for communicating with graphics unit 110; memory interface 122 for communicating with memory 104; and bus interface 130 for communicating with bus 106. Interfaces 126, 128, 122 and 130 are coupled together through switch 124, which can be any type of switching circuitry that is able to selectively couple together to interfaces 126, 128, 122 and 130.

Memory 104 may be any type of memory with a clocked interface that returns data along with a clock signal for latching the data during read operations. This may include memory implementing the SyncLink interface standard. In some embodiments, memory 104 includes a plurality of banks of memory, each of which includes a plurality of memory chips. As illustrated in FIG. 1, memory 104 includes interface 105, which interacts with memory interface 122 in north bridge 102 to send data to and receive data from north bridge 102.

Graphics unit 110 can include any special-purpose circuitry for performing graphics operations. This allows graphics computations to be off-loaded from processors 112, 114 and 116.

Bus 106 couples north bridge 102 to south bridge 118. Bus 106 may include any type of communication channel for coupling north bridge 102 to other devices in a computer system, including peripheral devices and memory devices. In one embodiment of the present invention, bus 106 is a PCI bus.

South bridge 118 includes circuitry for coupling together components of the computer system. More, particularly, south bridge 118 couples bus 106 to peripheral bus 120.

Peripheral bus 120 may include any type of communication channel for coupling a south bridge 118 to other devices in a computer system, including peripheral devices and memory devices. In one embodiment of the present invention, peripheral bus 120 is an ISA bus.

Peripheral bus 120 is coupled to ROM 140, which contains BIOS 142. In one embodiment of the present invention, BIOS 142 includes code for aligning data clock and data signals received at memory interface 122 from memory 104.

The system illustrated in FIG. 1 operates as follows. A processor, such as processor 112, performs a read operation. This read operation is relayed across processor bus 108 into memory interface 122 within north bridge 102. Memory interface 122 sends a read request to interface 105 within memory 104. Interface 105 returns the read data and an associated data clock signal to memory interface 122. This data clock signal is used to clock the data into memory interface 122. Next, the read operation is completed by transferring data across processor bus 108 to processor 112.

Description of Alignment Circuitry

Figure 2:
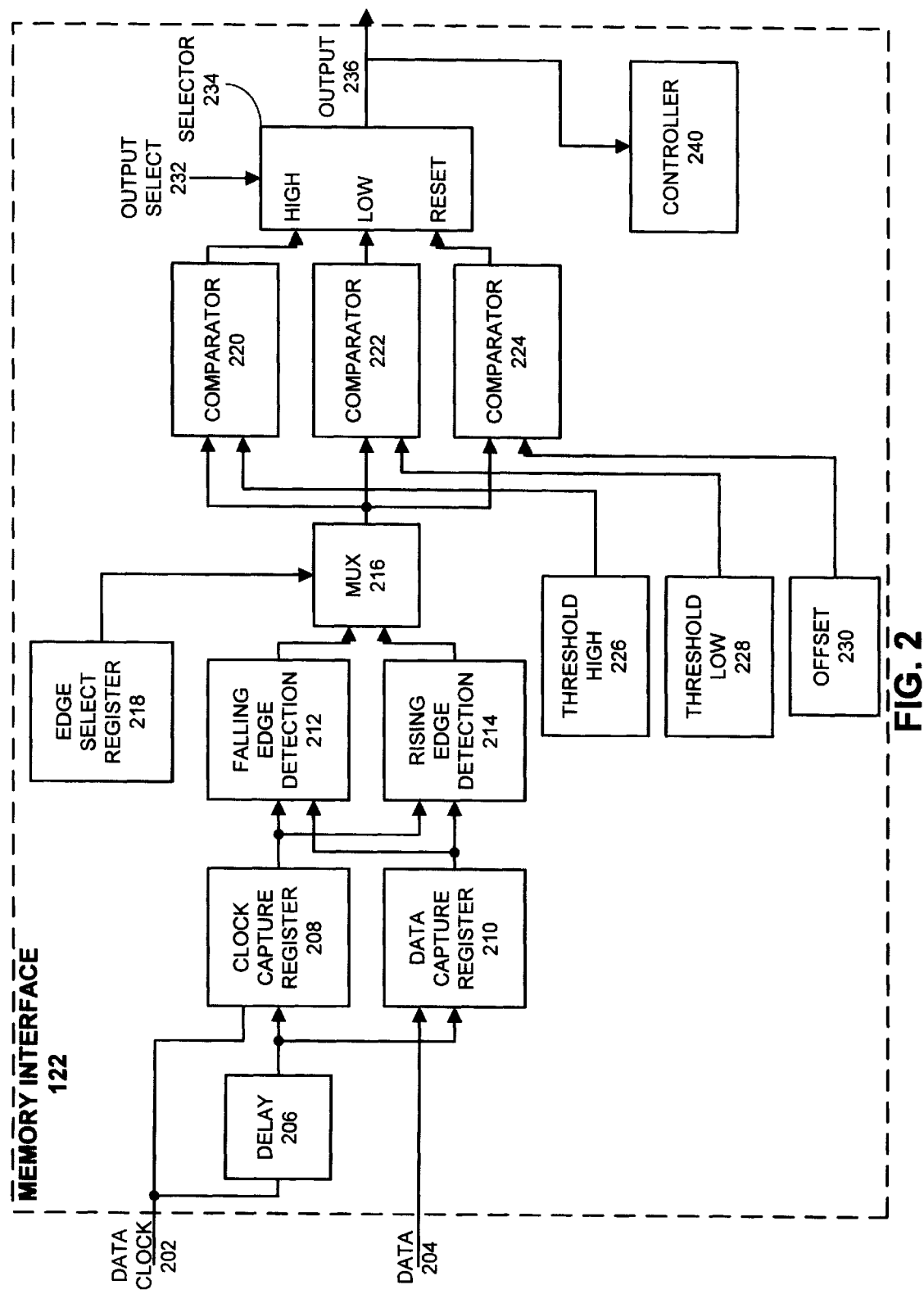
FIG. 2 is a block diagram illustrating special-purpose hardware within a memory controller for aligning a data clock signal and a data signal in accordance with an embodiment of the present invention.

FIG. 2 is a block diagram illustrating special-purpose hardware within a memory interface 122 from FIG. 1 for aligning data clock signal 202 and data signal 204 in accordance with an embodiment of the present invention. This circuit receives data clock signal 202 and data signal 204 from memory 104.

Data signal 204 passes into a data input of data capture register 210. Similarly, data clock signal 202 passes into a data input of clock capture register 208. Data clock signal 202 additionally passes through delay circuit 206, which introduces a series of delays into data clock signal 202, and the resulting delayed clock signals, which are spaced at regular intervals, feed into both data capture register 210 and clock capture register 208.

These delayed clock signals are used to capture waveforms for both data signal 204 and data clock signal 202 in data capture register 210 and clock capture register 208, respectively. A waveform for data clock signal 202 is captured in successive bits of clock capture register 208. These bits indicate if the waveform is above a threshold value or below a threshold value. Note that delay circuit 206, data capture register 210 and clock capture register 208 are described in more detail below with reference to FIGS. 3A, 3B and 3C.

The outputs of both clock capture register 208 and data capture register 210 feed into both falling edge detection circuit 212 and rising edge detection circuit 214. Falling edge detection circuit 212 generates a count of the number of bits between the start of a data eye in data signal 204 and a falling edge of data clock signal 202. In one embodiment, this is accomplished by exclusive-ORing bits in clock capture register 208 with the bits in data capture register 210 and counting the number of one values in the resulting data word. Note that the start of the data eye may be indicated by either a rising edge of the data signal 204 or a falling edge of the data signal 204.

Similarly, rising edge detection circuit 214 generates a count of the number of bits between the start of a data eye in data signal 204 and a rising edge of data clock signal 202. In one embodiment, this is be accomplished by exclusive-ORing bits in clock capture register 208 with the inverse of the bits in data capture register 210 and then counting the number of one values in the resulting data word. Note that the start of the data eye may be indicated by either a rising edge of the data signal 204 or a falling edge of the data signal 204.

The outputs of falling edge detection circuit 212 and rising edge detection circuit 214 feed through multiplexer (MUX 216) which selects between the two outputs. MUX 216 is controlled by edge select register 218, which holds a bit that selects between rising edge detection circuit 214 and falling edge detection circuit 212.

The output of MUX 216 feeds into comparators 220, 222 and 224, which compare the output of MUX 216 with values stored in threshold high register 226, threshold low register 228 and offset register 230. The outputs of comparators 220, 222 and 224 feed into selector circuit 234, which uses output select signal 232 to select inputs for controller 240. Controller 240 includes circuitry that generally controls the operation of memory interface 122.

The circuit illustrated in FIG. 2 operates as follows. Data clock signal 202 and data signal 204 feed into clock capture register 208 and data capture register 210, respectively. These registers capture simultaneous wave forms for data clock signal 202 and data signal 204. Next, the waveforms feed into falling edge detection circuit 212 and rising edge detection circuit 214, which measure the time between the rising edge or falling edge of data clock signal 202 and the start of a data window for data signal 204. The output of either rising edge detection circuit 214 or falling edge detection circuit 212 is gated by MUX 216 into comparators 220, 222 and 224. These comparators feed into selector circuit 234, which selectively gates the outputs of comparators 220, 222 and 224 into controller 240.

Ideally, the delay between the start of a data window in data signal 204 and the corresponding edge of data clock signal 202 is adjusted so that the edge falls in the middle of the data window. This can be tested by placing a value equal to one half of the data window width in offset register 230 and comparing the output of MUX 216 with this value. If these are not equal, the delay between data clock signal 202 and data signal 204 must either be incremented or decremented.

Alternatively, the delay can be tested against a low threshold value in register 226 and a high threshold value in register 228. If the delay is below the low threshold value, it is increased. If the delay is above the high threshold value, it is decreased. In this way, the delay can vary in a band between the high low value and the high threshold value without being re-adjusted.

Description of Delay Circuit

FIG. 3A illustrates part of the internal structure of delay circuit 206 from FIG. 2 in accordance with an embodiment of the present invention. Delay circuit 206 receives data clock signal 202, which passes through a chain of delay elements, including delay elements 302, 304, 306 and 308. The outputs of these delay elements comprise a series of delayed clock signals, including CK0, CK1, CK2, . . . , CK31. For example, if the delay elements have a 100 picosecond delay, the delay clock signals CK0, CK1, CK2 and CK31 span 3.2 nanoseconds at 100 picosecond intervals.

Description of Data Capture Register

FIG. 3B illustrates the internal structure of data capture register 210 for capturing a snapshot of data signal 204 in accordance with an embodiment of the present invention. Data capture register 210 comprises a collection of 32 D-flip-flops, including D-flip-flops 320, 322, 324 and 328. The inputs to each of the flip-flops are coupled to data signal 204. Each successive flip-flop takes a successive clock signal from clock signals CK0, CK1, CK2, . . . , CK31 from delay circuit 206. Each flip-flop is additionally coupled to an enable input, which enables the flip-flops to record data signal 204. Thus, when the D-flip-flops are enabled, clock signals CK0, CK1, CK2, . . . , CK31 cause the D-flip-flops to record data signal 204 at successive 100 picosecond increments. If data signal 204 is above a threshold value, a one value is recorded. If data signal 204 is below the threshold value, a zero value is recorded.

Description of Clock Capture Register

FIG. 3C illustrates the internal structure of clock capture register 208 for capturing a snapshot of data clock signal 202 in accordance with an embodiment of the present invention. Data clock capture register 208 comprises a collection of 32 D-flip-flops, including D-flip-flops 340, 342, 344 and 348. The inputs to each of the D-flip-flops are coupled to data clock signal 202. Each successive flip-flop takes a successive clock signal from clock signals CK0, CK1, CK2, . . . , CK31 generated by delay circuit 206. Each flip-flop is additionally coupled to an enable input, which enables the flip-flops to record data clock signal 202. Thus, when the D-flip-flops are enabled, clock signals CK0, CK1, CK2, . . . , CK31 cause the D-flip-flops to record data clock signal 202 at successive 100 picosecond intervals. If data signal 204 is above a threshold value, a one value is recorded. If data signal 204 is below the threshold value, a zero value is recorded.

Description of Trigger Signal

Figure 4A:
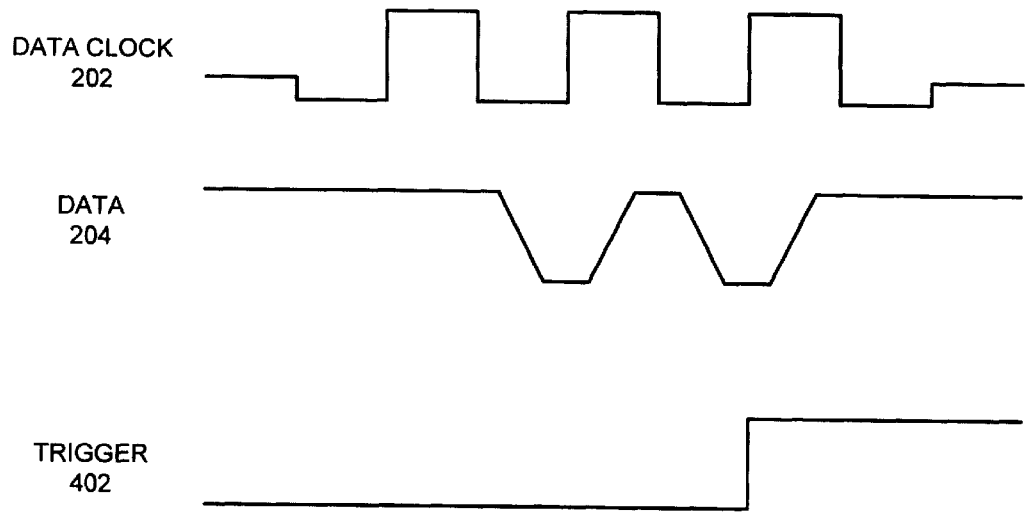
FIG. 4A illustrates timing relationships for a trigger signal in accordance with an embodiment of the present invention.

FIG. 4A illustrates timing relationships for trigger signal 402 in accordance with an embodiment of the present invention. Trigger signal 402 is asserted in response to changes in data signal 204 and data clock signal 202. Trigger signal 402 causes enable signal 321 from FIGS. 3A, 3B and 3C to be asserted to record data clock signal 202 and data signal 204 in clock capture register 208 and data capture register 210, respectively.

Figure 4B:
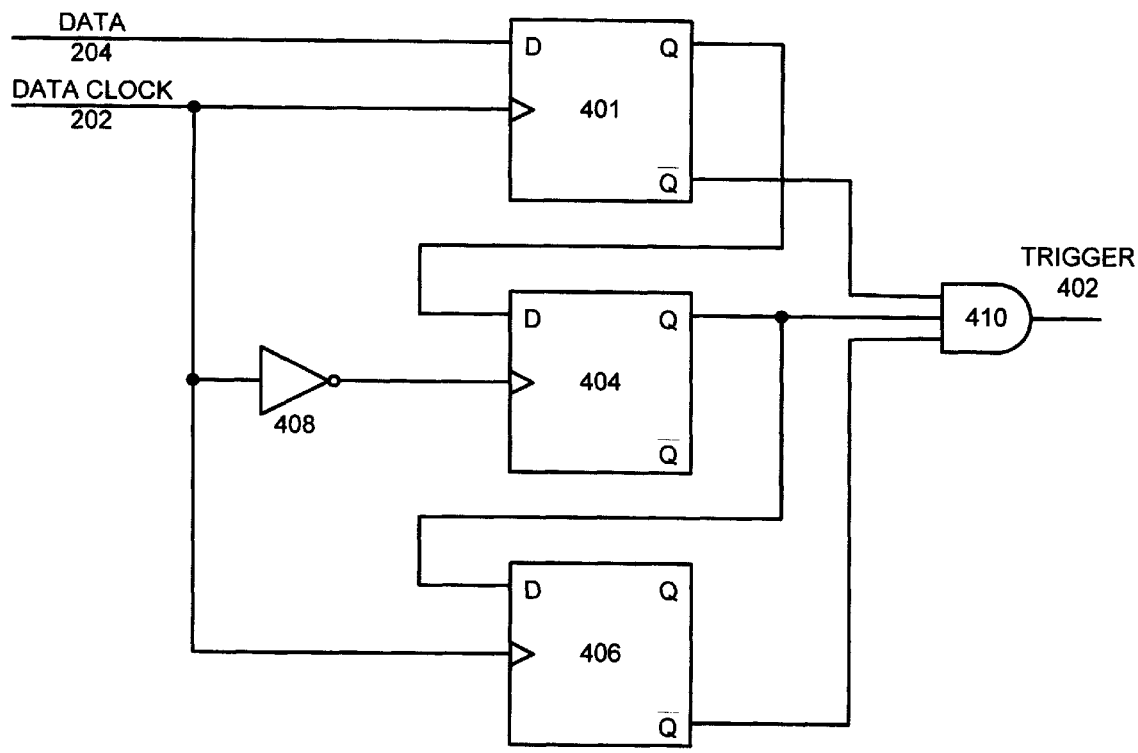
FIG. 4B illustrates a circuit for producing the trigger signal in accordance with an embodiment of the present invention.

FIG. 4B illustrates a circuit for producing trigger signal 402 in accordance with an embodiment of the present invention. In this circuit, data signal 204 feeds through three D-flip-flops, including D-flip-flops 401, 404 and 406. Data clock signal 202 feeds into D-flip-flops 401 and 406 directly, whereas data clock signal 202 feeds through inverter 408 into D-flip-flop 404. Hence, D-flip-flops 401 and 406 are clocked by rising edges of data clock signal 202 and D-flip-flop 404 is clocked by falling edges of data clock signal 202. The output of D-flip-flop 404 and the inverse outputs of D-flip-flops 401 and 406 feed into inputs of AND gate 410, which generates trigger signal 402. Thus, trigger signal 402 is asserted whenever D-flip-flops 401, 404 and 406 assume the values 0, 1, 0. In this case, data signal 204 must have changed from low to high to low so as illustrated in FIG. 4A before trigger signal 402 is asserted.

Description of BIOS Version of Alignment Circuitry

Figure 5:
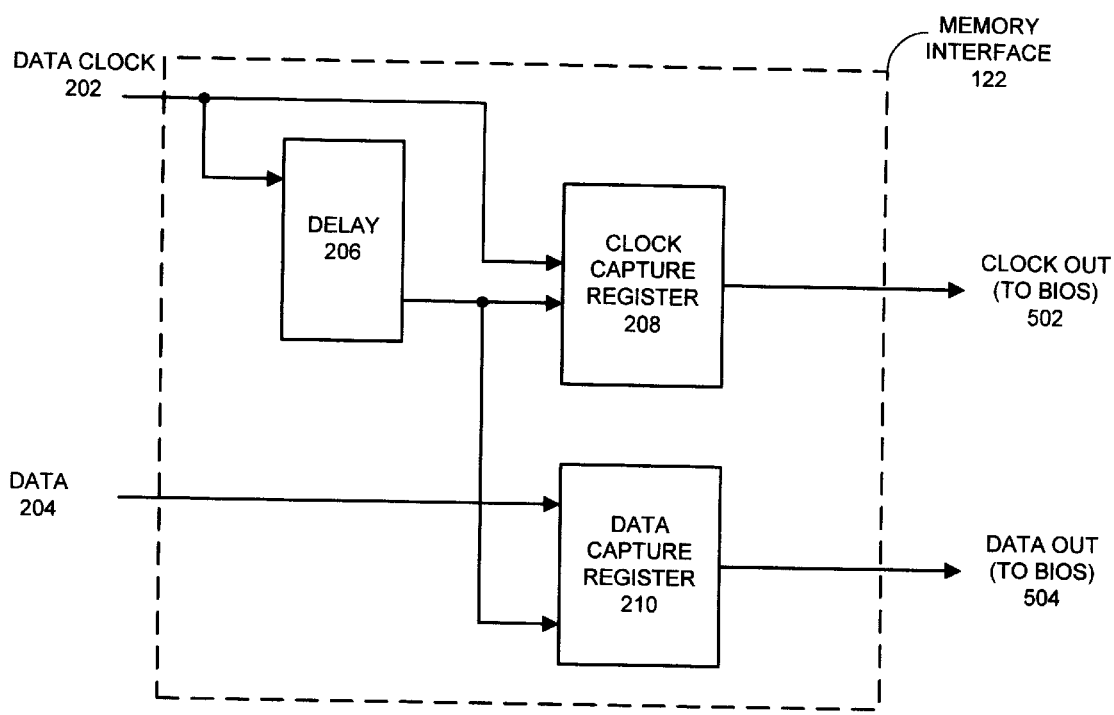
FIG. 5 is a block diagram illustrating hardware within a memory controller that works in concert with a BIOS program to align data clock and data signals in accordance with an embodiment of the present invention.

FIG. 5 is a block diagram illustrating hardware within memory interface 122 that works in concert with BIOS 142 (from FIG. 1) to align data clock and data signals in accordance with an embodiment of the present invention. This circuit receives data clock signal 202 and data signal 204 from interface 105 within memory 104. Data signal 204 passes into a data input of data capture register 210. Similarly, data clock signal 202 passes into a data input of clock capture register 208. Data clock signal 202 additionally passes through delay circuit 206, which introduces a series of delays into clock signal 202, and the resulting delayed clock signals, which are spaced at regular intervals, feed into both data capture register 210 and clock capture register 208. These delayed clock signals are used to capture waveforms for both data signal 204 and data clock signal 202 in data capture register 210 and clock capture register 208, respectively.

The waveform for data clock signal 202 is captured in successive bits of clock capture register 208. These bits indicate if the waveform is above a threshold value or below a threshold value. Note that delay circuit 206, data capture register 210 and clock capture register 208 are described in more detail above with reference to FIGS. 3A, 3B and 3C.

The output of clock capture register 208 becomes clock out signal 502, and the output of data capture register 210 becomes data out signal 504. Clock out signal 502 and data out signal 504 are read by a program executing code from BIOS 142 from FIG. 1. This program includes code to perform the same comparison and selection functions that are performed by the special-purpose hardware illustrated in FIG. 2 to determine if data clock signal 202 and data signal 204 are properly aligned.

Description of Enable Circuitry

Figure 6A:
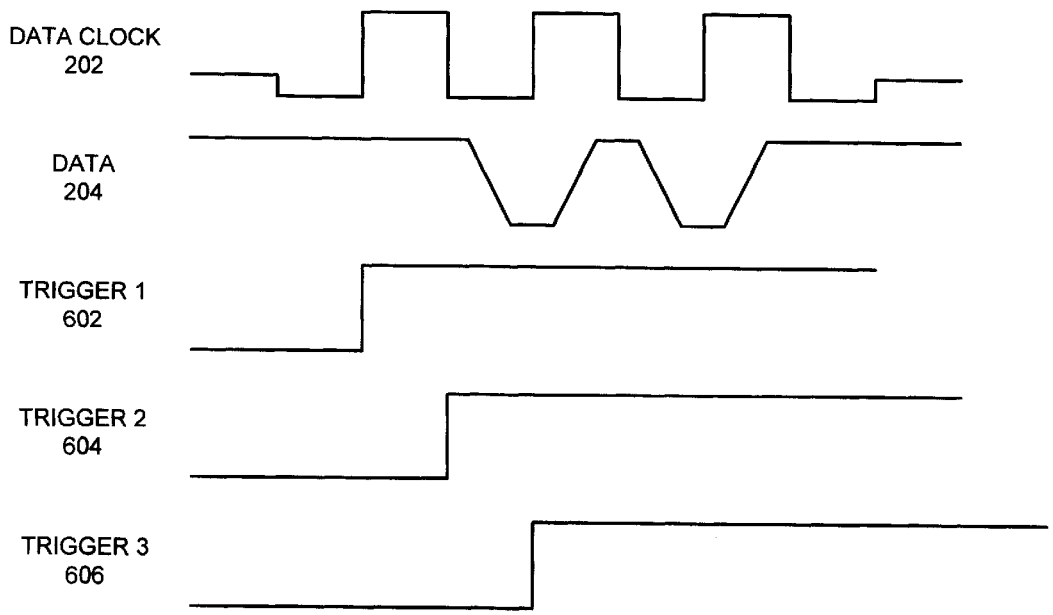
FIG. 6A illustrates timing relationships for a set of trigger signals in accordance with an embodiment of the present invention.

FIG. 6A illustrates timing relationships for a set of trigger signals in accordance with an embodiment of the present invention. FIG. 6A illustrates how trigger signals 602, 604 and 606 are asserted in response to changes in data signal 204 and data clock signal 202. Trigger signals 602, 604 and 606 cause enable signal 321 from FIGS. 3A, 3B and 3C to be periodically asserted to record data clock signal 202 and data signal 204 in clock capture register 208 and data capture register 210, respectively.

Figure 6B:
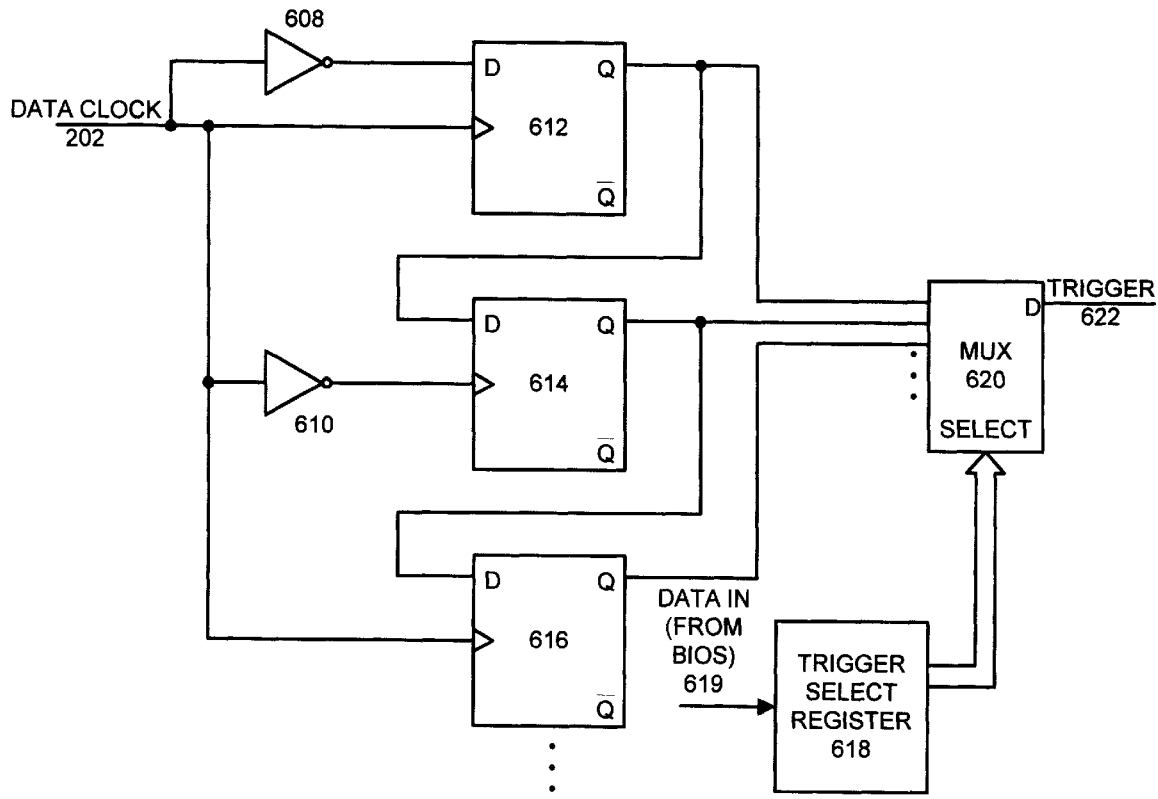
FIG. 6B illustrates a circuit for producing the set of trigger signals in accordance with an embodiment of the present invention.

FIG. 6B illustrates a circuit for producing the set of trigger signals in accordance with an embodiment of the present invention. In this circuit, data clock signal 202 feeds through inverter 608, and through a chain of D-flip-flops, including D-flip-flops 612, 614 and 616. Data clock signal 202 also feeds into the clock inputs of D-flip-flops 612 and 616, and through inverter 610 into a clock input of D-flip-flop 614. Thus, D-flip-flops 612 and 616 are clocked by rising edges of data clock signal 202, and D-flip-flop 614 is clocked by falling edges of data clock signal 202.

The outputs of D-flip-flops 612, 164 and 616 feed into inputs of MUX 620, which select one of these inputs to create trigger signal 622. The contents of trigger select register 618 feeds into the select inputs of MUX 620. Thus, the contents of trigger select register 618 determines which D-flip-flip will produce trigger signal 622.

Trigger select register 618 is fed by data in signal 619, which originates from a program executing code from BIOS 142 in FIG. 1. In this way a BIOS program can set trigger signal 622 to be asserted a certain number of clock edges from when data clock signal 202 becomes active.

Description of Alignment Process

Figure 7:
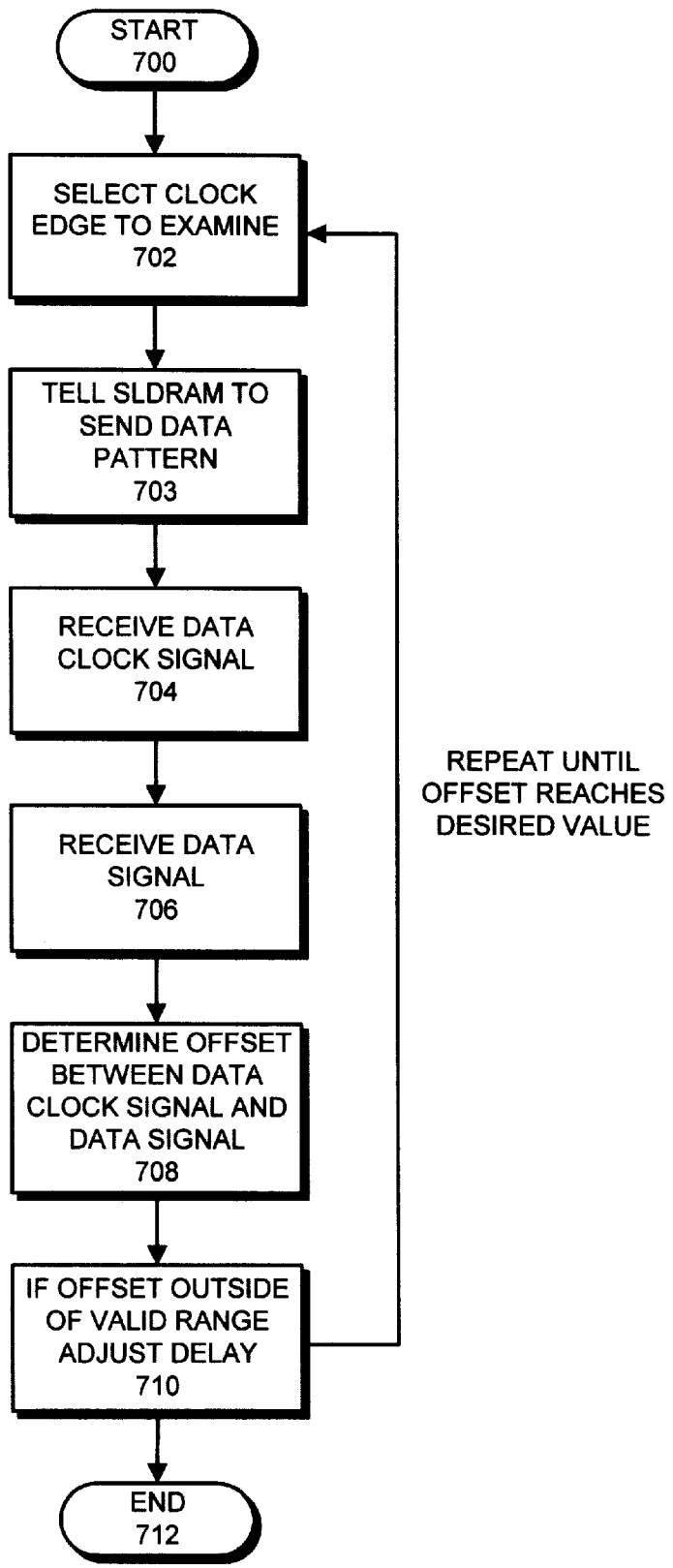
FIG. 7 is a flow chart illustrating the process of aligning a data clock signal and a data signal received from a memory in accordance with an embodiment of the present invention.

FIG. 7 is a flow chart illustrating the process of aligning a data clock signal and a data signal received from a memory in accordance with an embodiment of the present invention. The system first selects whether to align a rising or falling clock edge of data clock signal 202 (state 702). This can be done by setting edge select register 218 from FIG. 1. Next, the system causes the SyncLink Dynamic RAM (SLDRAM) to send a data pattern (state 7045. This can be accomplished by asking the SLDRAM to perform a read operation from a location containing a known data pattern. Alternatively, the SLDRAM can process a special calibration command, which returns a known data pattern.

Next, the system receives both data clock signal 202 (in state 704) and data signal 204 (in state 706) from the SLDRAM. The system next determines an offset between data clock signal 202 and data signal 204 (state 708). If the offset is outside of a valid range, the system adjusts the delay between data clock signal 202 and data signal 204. This adjustment can take place by programming a variable delay circuit located within memory interface 122 or interface 105 in memory 104 from FIG. 1. Alternatively, the adjustment can be made be sending a command to memory 104 (from FIG. 1) to adjust the alignment between data signal 204 and data clock signal 202. The above process is repeated until the offset reaches a desired value or falls within a desired range.

In one embodiment of the present invention, the above process can take place in special-purpose hardware located within memory interface 122. In this embodiment, the alignment can take place periodically while the computer system is operating. In another embodiment, the above process can be accomplished during system startup by a BIOS program that has been modified to adjust delay values between data clock signal 202 and data signal 204.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. An apparatus for aligning a data signal and a data clock signal received from a memory in a computer system, comprising:

a data input that is configured to receive the data signal from the memory;

a clock input that is configured to receive the data clock signal from the memory;

an offset mechanism that is configured to determine an offset between the data clock signal and the data signal;

a comparison mechanism that is configured to determine if the offset is outside a valid range; and an adjustment mechanism that is configured to adjust a delay between the data clock signal and the data signal if the offset is outside of the valid range.

2. The apparatus of claim 1, wherein the apparatus is configured to operate periodically while the computer system is running.

3. The apparatus of claim 1, wherein the apparatus is configured to operate during a system startup process.

4. The apparatus of claim 3, further comprising a read only memory including code that when executed by a processor implements the offset mechanism, the comparison mechanism and the adjustment mechanism.

5. The apparatus of claim 4, wherein the code is part of a system BIOS.

6. The apparatus of claim 1, wherein the apparatus is implemented by special-purpose hardware located within a memory controller, which is coupled to the memory.

7. The apparatus of claim 1, wherein the adjustment mechanism is configured to send configuration commands to the memory to adjust the delay.

8. The apparatus of claim 1, wherein the adjustment mechanism is configured to adjust the delay within a memory controller located outside of the memory.

9. The apparatus of claim 1, wherein the comparison mechanism is configured to determine if the offset is below a low threshold value or above a high threshold value.

10. The apparatus of claim 1, wherein the comparison mechanism is configured to determine if the offset is not equal to a pre-specified offset value.

11. The apparatus of claim 1, wherein the offset mechanism is configured to use one of a rising edge and a falling edge of the data clock signal to determine the offset from.

12. The apparatus of claim 1, wherein the adjustment mechanism is configured to either increase or decrease the delay between the data clock signal and the data signal.

13. The apparatus of claim 1, wherein the memory adheres to the SyncLink interface standard.

14. The apparatus of claim 1, further comprising a read request mechanism that is configured to send a read request to the memory.

15. The apparatus of claim 1, wherein the offset mechanism, the comparison mechanism and the adjustment mechanism are configured to iteratively test and adjust the offset until the offset falls within the valid range.

16. The apparatus of claim 1, wherein the offset mechanism, the comparison mechanism and the adjustment mechanism are configured to adjust the offset for each memory device in the computer system.

17. An computer system that aligns a data signal and a data clock signal received from a memory within the computer system, comprising:

a processor;

the memory; and a memory controller coupled to the memory, including:

a data input that is configured to receive the data signal from the memory;

a clock input that is configured to receive the data clock signal from the memory;

an offset mechanism that is configured to determine an offset between the data clock signal and the data signal;

a comparison mechanism that is configured to determine if the offset is outside a valid range; and an adjustment mechanism that is configured to adjust a delay between the data clock signal and the data signal if the offset is outside the valid range.

18. An apparatus for aligning a data signal and a data clock signal received from a memory in a computer system, comprising:

a read request mechanism that is configured to send a read request to the memory;

a data input that is configured to receive the data signal from the memory;

a clock input that is configured to receive the data clock signal from the memory;

an offset mechanism that is configured to determine an offset between the data clock signal and the data signal using a rising edge or a falling edge of the data clock signal to determine the offset from;

a comparison mechanism that is configured to determine if the offset is outside a valid range below a low threshold value or above a high threshold value; and an adjustment mechanism that is configured to adjust a delay between the data clock signal and the data signal if the offset is outside of the valid range by increasing or decreasing the delay.

19. The apparatus of claim 18, wherein the apparatus is configured to operate periodically while the computer system is running.

20. The apparatus of claim 18, wherein the apparatus is configured to operate during a system startup process.

21. The apparatus of claim 20, further comprising a read only memory including code that when executed by a processor implements the offset mechanism, the comparison mechanism and the adjustment mechanism.

22. The apparatus of claim 18, wherein the apparatus is implemented by special-purpose hardware located within a memory controller, which is coupled to the memory.

23. The apparatus of claim 18, wherein the adjustment mechanism is configured to send configuration commands to the memory to adjust the delay.

24. The apparatus of claim 18, wherein the adjustment mechanism is configured to adjust the delay in a memory controller located outside of the memory.

25. The apparatus of claim 18, wherein the comparison mechanism is configured to determine if the offset is not equal to a pre-specified offset value.

26. The apparatus of claim 18, wherein the offset mechanism, the comparison mechanism and the adjustment mechanism are configured to iteratively test and adjust the offset until the offset falls within the valid range.

27. The apparatus of claim 18, wherein the offset mechanism, the comparison mechanism and the adjustment mechanism are configured to adjust the offset for each memory device in the computer system.

* * * * *